US012775927B2

(12) United States Patent
Koo et al.

(10) Patent No.: US 12,775,927 B2
(45) Date of Patent: Oct. 27, 2026

(54) PAYMENT METHOD AND DEVICE USING ULTRA-WIDEBAND COMMUNICATION

(71) Applicant: Samsung Electronics Co., Ltd., Suwon-si (KR)

(72) Inventors: Jonghoe Koo, Suwon-si (KR); Sungkyu Cho, Suwon-si (KR); Sehee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/287,364

(22) PCT Filed: Apr. 19, 2022

(86) PCT No.: PCT/KR2022/005586
§ 371 (c)(1),
(2) Date: Oct. 18, 2023

(87) PCT Pub. No.: WO2022/225298
PCT Pub. Date: Oct. 27, 2022

(65) Prior Publication Data

US 2024/0202700 A1 Jun. 20, 2024

(30) Foreign Application Priority Data

Apr. 19, 2021 (KR) ........................ 10-2021-0050456

(51) Int. Cl.
*G06Q 20/32* (2012.01)
*G06Q 20/38* (2012.01)

(52) U.S. Cl.
CPC ....... *G06Q 20/3278* (2013.01); *G06Q 20/325* (2013.01); *G06Q 20/38215* (2013.01); *G06Q 20/3829* (2013.01)

(58) Field of Classification Search
CPC ............. G06Q 20/3278; G06Q 20/325; G06Q 20/38215; G06Q 20/3829
(Continued)

(56) References Cited

U.S. PATENT DOCUMENTS 10,373,148 B1 * 8/2019 Dixon .................... G06Q 20/22
10,387,876 B1 * 8/2019 Buentello ............ G06Q 20/405
(Continued)

FOREIGN PATENT DOCUMENTS

JP 2020-201837 A 12/2020
KR 10-2011-0050609 A 5/2011
(Continued)

OTHER PUBLICATIONS

Extended European Search Report dated Dec. 8, 2023, issued in European Application No. 22791998.2-1218.
(Continued)

*Primary Examiner* — Hai Tran
(74) *Attorney, Agent, or Firm* — Jefferson IP Law, LLP

(57) ABSTRACT

The present disclosure provides a UWB-based safe proximity payment method. A method of a first electronic device of the present disclosure may comprise the steps of: broadcasting a UWB initiation message including certificate information of the first electronic device; receiving, from at least one second electronic device, a UWB response message including identification information of a payment application included in the second electronic device and certificate information of the payment application; and determining a priority of the at least one second electronic device on the basis of the UWB response message.

13 Claims, 12 Drawing Sheets

(58) Field of Classification Search
USPC ............................................................ 705/44
See application file for complete search history.

(56) References Cited

U.S. PATENT DOCUMENTS

| | | | | |
|---|---|---|---|---|
| 11,042,864 | B1 * | 6/2021 | Dixon | G06Q 20/3276 |
| 2013/0030931 | A1 * | 1/2013 | Moshfeghi | H04B 5/73 705/16 |
| 2013/0080276 | A1 * | 3/2013 | Granbery | G06Q 20/3823 705/39 |
| 2015/0161587 | A1 * | 6/2015 | Khan | G06Q 20/3223 705/44 |
| 2015/0348009 | A1 * | 12/2015 | Brown | G06Q 20/352 705/16 |
| 2015/0350814 | A1 * | 12/2015 | Krochmal | H04W 4/80 455/41.2 |
| 2015/0350865 | A1 * | 12/2015 | Conn | H04W 76/14 455/41.2 |
| 2017/0201380 | A1 | 7/2017 | Schaap et al. | |
| 2018/0330368 | A1 * | 11/2018 | Slupesky | H04L 67/02 |
| 2019/0098499 | A1 * | 3/2019 | Lerch | G06Q 20/3821 |
| 2020/0014526 | A1 | 1/2020 | Hammerschmidt et al. | |
| 2020/0336303 | A1 * | 10/2020 | Sierra | H04L 63/1475 |
| 2020/0351651 | A1 * | 11/2020 | Koo | H04W 12/35 |
| 2020/0363524 | A1 * | 11/2020 | Yoon | H04W 12/069 |
| 2021/0081912 | A1 | 3/2021 | Park et al. | |
| 2021/0312424 | A1 * | 10/2021 | Lee | G06Q 20/3825 |
| 2022/0001836 | A1 | 1/2022 | Baek et al. | |
| 2024/0086890 | A1 * | 3/2024 | Lee | G06Q 20/325 |
| 2024/0305984 | A1 * | 9/2024 | Cho | G06F 21/53 |

FOREIGN PATENT DOCUMENTS

| | | | |
|---|---|---|---|
| KR | 10-2011-0107782 | A | 10/2011 |
| KR | 10-2016-0119725 | A | 10/2016 |
| KR | 10-2017-0047696 | A | 5/2017 |
| KR | 10-2018-0096699 | A | 8/2018 |
| KR | 10-2020-0005477 | A | 1/2020 |
| KR | 10-2020-0049269 | A | 5/2020 |
| KR | 10-2020-0070054 | A | 6/2020 |
| KR | 10-2021-0033311 | A | 3/2021 |

OTHER PUBLICATIONS

International Search Report and written opinion dated Aug. 1, 2022, issued in International Application No. PCT/KR2022/005586.

Korean Office Action dated Jan. 1, 2026, issued in Korean Application No. 10-2021-0050456.

* cited by examiner

PAYMENT METHOD AND DEVICE USING ULTRA-WIDEBAND COMMUNICATION

CROSS-REFERENCE TO RELATED APPLICATION(S)

This application is a U.S. National Stage application under 35 U.S.C. § 371 of an International application number PCT/KR2022/005586, filed on Apr. 19, 2022, which is based on and claims the benefit of a Korean patent application number 10-2021-0050456, filed on Apr. 19, 2021, in the Korean Intellectual Property Office, the disclosure of each of which is incorporated by reference herein in its entirety.

TECHNICAL FIELD

The disclosure relates to UWB communication and, more specifically, to a payment method and device using UWB.

BACKGROUND ART

The Internet is evolving from the human-centered connection network by which humans create and consume information to the Internet of Things (IOT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using ultra-wide band (UWB).

DETAILED DESCRIPTION OF THE INVENTION

Technical Problem

The disclosure provides a method for performing secure proximity payment using UWB. The disclosure also provides a proximity payment method for addressing the connection delay issue that occurs when performing UWB secure ranging using out-of-band (OOB) communication and a UWB message.

Technical Solution

According to various embodiments of the disclosure, a method by a first electronic device processing payment using UWB communication may comprise broadcasting a UWB initiation message including certificate information about the first electronic device, receiving, from at least one second electronic device, a UWB response message including at least one of identification information about a payment application included in the second electronic device and certificate information about the payment application for verifying the identification information, and determining priorities for the at least one second electronic device based on the UWB response message.

According to various embodiments of the disclosure, a method by a second electronic device processing payment using UWB communication may comprise receiving, from a first electronic device, a UWB initiation message including certificate information about the first electronic device, obtaining identification information about a payment application included in the second electronic device, and transmitting, to the first electronic device, a UWB response message including the identification information about the payment application and certificate information about the payment application for verifying the identification information.

According to various embodiments of the disclosure, a first electronic device processing payment using UWB communication may comprise a transceiver and a controller connected to the transceiver. The controller may be configured to broadcast a UWB initiation message including certificate information about the first electronic device, receive, from at least one second electronic device, a UWB response message including at least one of identification information about a payment application included in the second electronic device and certificate information about the payment application for verifying the identification information, and determine priorities for the at least one second electronic device based on the UWB response message.

According to various embodiments of the disclosure, a second electronic device processing payment using UWB communication may comprise a transceiver and a controller. The controller may be configured to receive, from a first electronic device, a UWB initiation message including certificate information about the first electronic device, obtain identification information about a payment application included in the second electronic device, and transmit, to the first electronic device, a UWB response message including the identification information about the payment application and certificate information about the payment application for verifying the identification information.

Advantageous Effects

It is possible to increase the security of proximity payment according to the proximity payment method of the disclosure. Further, it is possible to address the connection delay issue that occurs when performing UWB secure ranging using OOB communication according to the proximity payment method and UWB message of the disclosure.

MODE FOR CARRYING OUT THE INVENTION

Figure 1:
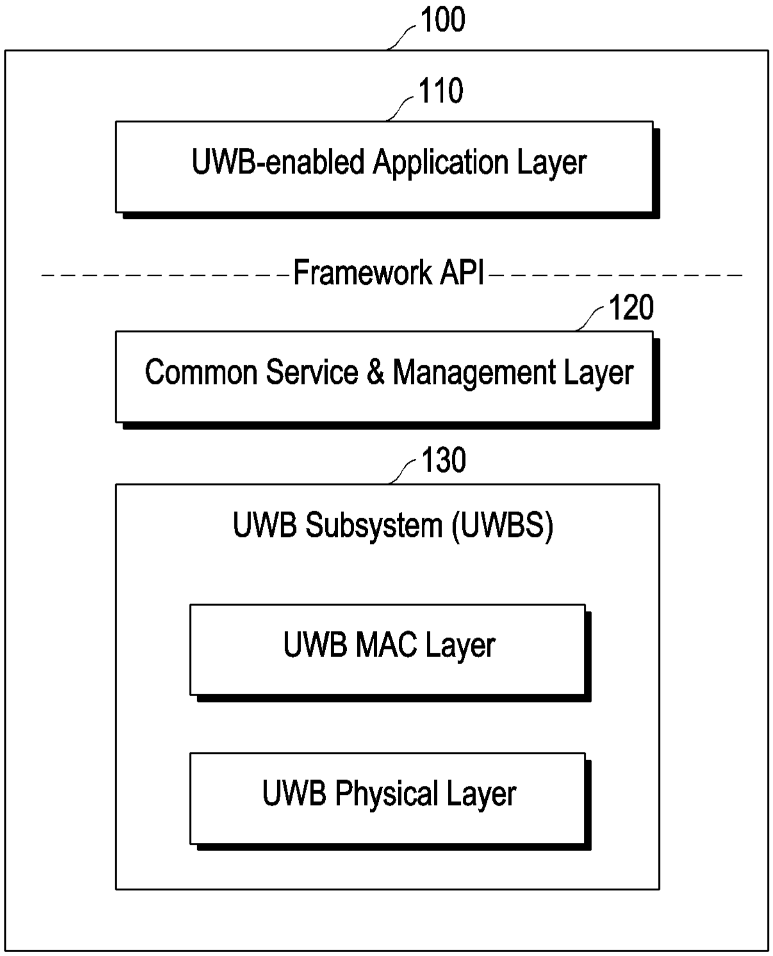
FIG. 1 is a view illustrating an example layer configuration of an electronic device supporting a UWB-based service.

Hereinafter, embodiments of the disclosure are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments of the disclosure, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unnecessarily unclear, the detailed description of known functions or configurations may be skipped in describing embodiments of the disclosure. The terms as used herein are defined considering the functions in the present disclosure and may be replaced with other terms according to the intention or practice of the user or operator. Therefore, the terms should be defined based on the overall disclosure.

Hereinafter, embodiments of the present invention are described in detail with reference to the accompanying drawings. Further, although a communication system using UWB (e.g., the UWB communication system specified by the FiRa Consortium) is described in connection with embodiments of the present invention, as an example, embodiments of the present invention may also apply to other communication systems with similar technical background or features. For example, a communication system using Bluetooth or ZigBee may be included therein. Further, embodiments of the present invention may be modified in such a range as not to significantly depart from the scope of the present invention under the determination by one of ordinary skill in the art and such modifications may be applicable to other communication systems.

When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

According to the definitions by the Federal Communications Commission (FCC), UWB may refer to a wireless communication technology that uses a bandwidth of 500 MHz or more or a bandwidth corresponding to a center frequency of 20% or more. UWB may mean a band itself to which UWB communication is applied. UWB may enable secure and accurate ranging between devices.

Operations of a UWB-based service may include a service initiation step for initiating the UWB-based service, a key provisioning step for providing a key for security, a discovery step for discovering a device, a connection step including secure channel creation and parameter exchange, and/or a UWB ranging step for measuring a distance/direction (angle) between devices.

Meanwhile, according to an embodiment, some steps may be omitted. For example, in an embodiment, the service initiation step and the UWB ranging step may be mandatory steps, but the key provisioning step, discovery step, and connection step may be optional steps. As another example, in another embodiment, the service initiation step, the key provisioning step, and the UWB ranging step may be mandatory steps, but the discovery step and connection step may be optional steps.

The terminology used herein is provided for a better understanding of the disclosure, and changes may be made thereto without departing from the technical spirit of the disclosure.

"Application dedicated file (ADF)" may be, e.g., a data structure capable of hosting application specific data or security data (e.g., credential, cryptographic key) used by an application or secure element (SE) (e.g., embedded SE (eSE)).

"Application protocol data unit (APDU)" may be a command and a response used when communicating with a secure element (SE) (e.g., embedded SE).

"Application specific data" may be, e.g., data used by a specific service and application regardless of the place (e.g., applet, device, etc.).

"Controller" may be a ranging device that defines and controls ranging control messages (RCM). In the disclosure, the ranging device may be, e.g., an enhanced ranging device (ERDEV) as defined in the IEEE Std 802.15.4z standard.

"Controllee" may be a ranging device using a ranging parameter in the RCM received from the controller.

Unlike "static STS," "dynamic STS" may be an operation mode in which the STS is not repeated during a ranging session. In an embodiment, the STS may be managed by the ranging device, and the ranging session key that generates STS may be managed by a secure component.

"Applet" may be an applet that implements an APDU interface running on a secure component and is identified by an application (applet) ID (AID). This applet may host the data needed for secure ranging. In an embodiment, the applet may be, e.g., a FiRa applet as defined in the FIRA CONSORTIUM COMMON SERVICE & MANAGEMENT LAYER (CSML) specifications.

"Ranging device" is a ranging device that may communicate with another ranging device using a pre-defined profile (e.g., UWB-enabled door lock) or a ranging device capable of supporting a pre-defined UWB ranging service for performing a ranging session with another ranging device. In this disclosure, the ranging device may be referred to as a UWB device or a UWB ranging device. In an embodiment, the ranging device may be, e.g., a FiRa device as defined in the FIRA CONSORTIUM CSML specification.

"UWB-enabled application" may be an application using a Framework API for configuring an OOB Connector, a Secure Service, and/or a UWB service for a UWB session. In this disclosure, "UWB-enabled Application" may be abbreviated as an application or a UWB application. In an embodiment, the UWB-enabled application may be, e.g., a FiRa-enabled application defined in the FIRA CONSORTIUM CSML specification.

"Framework" may be, e.g., a collection of logical software components including an OOB connector, secure Service, and/or UWB service. In an embodiment, the framework may be, e.g., FiRa Framework as defined in the FIRA CONSORTIUM CSML specification.

"OOB Connector" may be a software component for establishing out-of-band (OOB) communication (e.g., Bluetooth low energy (BLE) communication) between ranging devices. In an embodiment, the OOB connector may be, e.g., a FiRa OOB connector as defined in the FIRA CONSORTIUM CSML specification.

"Profile" may be a previously defined set of UWB and OOB configuration parameters. In an embodiment, the profile may be, e.g., a FiRa profile as defined in the FIRA CONSORTIUM CSML specification.

"Profile manager" may implement a profile available on the ranging device. In an embodiment, the profile manager may be, e.g., a FiRa profile manager as defined in the FIRA CONSORTIUM CSML specification.

"Smart ranging device" may be a ranging device (e.g., physical access reader) capable of hosting one or more UWB-enabled applications and implementing the framework or a ranging device that implements a specific screen application provided by the manufacturer. The smart ranging device may be a ranging device capable of installing multiple UWB-enabled applications to support a UWB ranging-based service to perform a ranging session with another ranging device or smart ranging device. In an embodiment, the smart ranging device may be, e.g., a FiRa smart device as defined in the FIRA CONSORTIUM CSML specification.

"Global Dedicated File (GDF)" may be a root level of application specific data including data required to establish a USB session.

"Framework API" may be an API used by a UWB-enabled Application to communicate with the Framework.

"Initiator" may be a Ranging Device that initiates a ranging exchange.

"Object identifier (OID)" may be an identifier of the ADF in the application data structure or a unique ID for identifying a service provider SP.

"Out-of-band (OOB)" may be data communication that does not use UWB as an underlying wireless technology.

"Responder" may be a ranging device that responds to the Initiator in a ranging exchange.

"Scrambled timestamp sequence (STS)" may be a ciphered sequence for increasing the integrity and accuracy of ranging measurement timestamps. In an embodiment, the STS may be generated from the ranging session key.

"Secure channel" may be a data channel that prevents overhearing and tampering.

"Secure component" may be a component that interfaces with UWBS for the purpose of providing RDS to UWBS, e.g., when dynamic STS is used. It may also host UWB-enabled application data.

"Secure Element (SE)" may be a tamper-resistant secure hardware component that may be used as a Secure Component in the Ranging Device.

"Secure service" may be a component for interfacing with the secure component of the system, such as trusted execution environment (TEE) or secure element.

"Static STS" is an operation mode in which STS is repeated during a session, and does not need to be managed by the secure component.

"SUS applet" may be an applet on the secure component operating as an end point for the secure channel between secure components, such as UWBS and SE.

"UWB Service" may be an implementation-specific software component that provides access to the UWBS.

It may be considered that the "UWB session" is established when the controller and controllee(s) may start UWB ranging. The UWB session may be a period from when the controller and the controlee start communication through UWB until the communication stops. A UWB Session may include ranging, data transfer, or both ranging and data transfer.

"UWB session ID" may be an ID (e.g., an integer) for identifying the UWB session.

"UWB session key" may be a key used to protect the UWB Session. In an embodiment, the UWB session key may be used to generate the STS. In this disclosure, the UWB session key may be a UWB ranging session key (URSK), and may be abbreviated as a session key.

"UWB Subsystem (UWBS)" may be a hardware component implementing the UWB PHY and MAC specifications. The UWBS may have an interface to the FiRa framework where the UCI logical interface layer has been implemented and an interface for the secure component to search for the RDS. In an embodiment, the UWB PHY and MAC specifications may be, e.g., the FiRa CONSORTIUM PHY and MAC specifications.

When determined to make the subject matter of the present invention unnecessarily unclear, the detailed description of related known functions or features may be skipped in describing the disclosure.

Hereinafter, various embodiments of the disclosure are described with reference to the accompanying drawings.

FIG. 1 is a view illustrating an example layer configuration of an electronic device supporting a UWB-based service.

The electronic device (UWB device) of FIG. 1 may be, e.g., a smart ranging device.

Referring to FIG. 1, the electronic device 100 may include a UWB-enabled application layer 110, a common service & management layer 120, and/or a UWB sub-system (UWBS) 130 including a UWB MAC layer and a UWB physical layer.

The UWB-enabled application layer 100 may be a layer of an application (e.g., FiRa-enabled application) using the framework API to constitute an OOB connector, secure service, and UWB service for, e.g., a UWB session.

The common service & management layer 110 may define a common component and procedure necessary to implement, e.g., UWB secure ranging.

The UWB MAC layer and the UWB physical layer may be collectively referred to as a UWB subsystem (UWBS) 130. The UWBS may be based on the FiRa PHY and MAC specifications referencing the IEEE 802.15.4z specifications.

Figure 2:
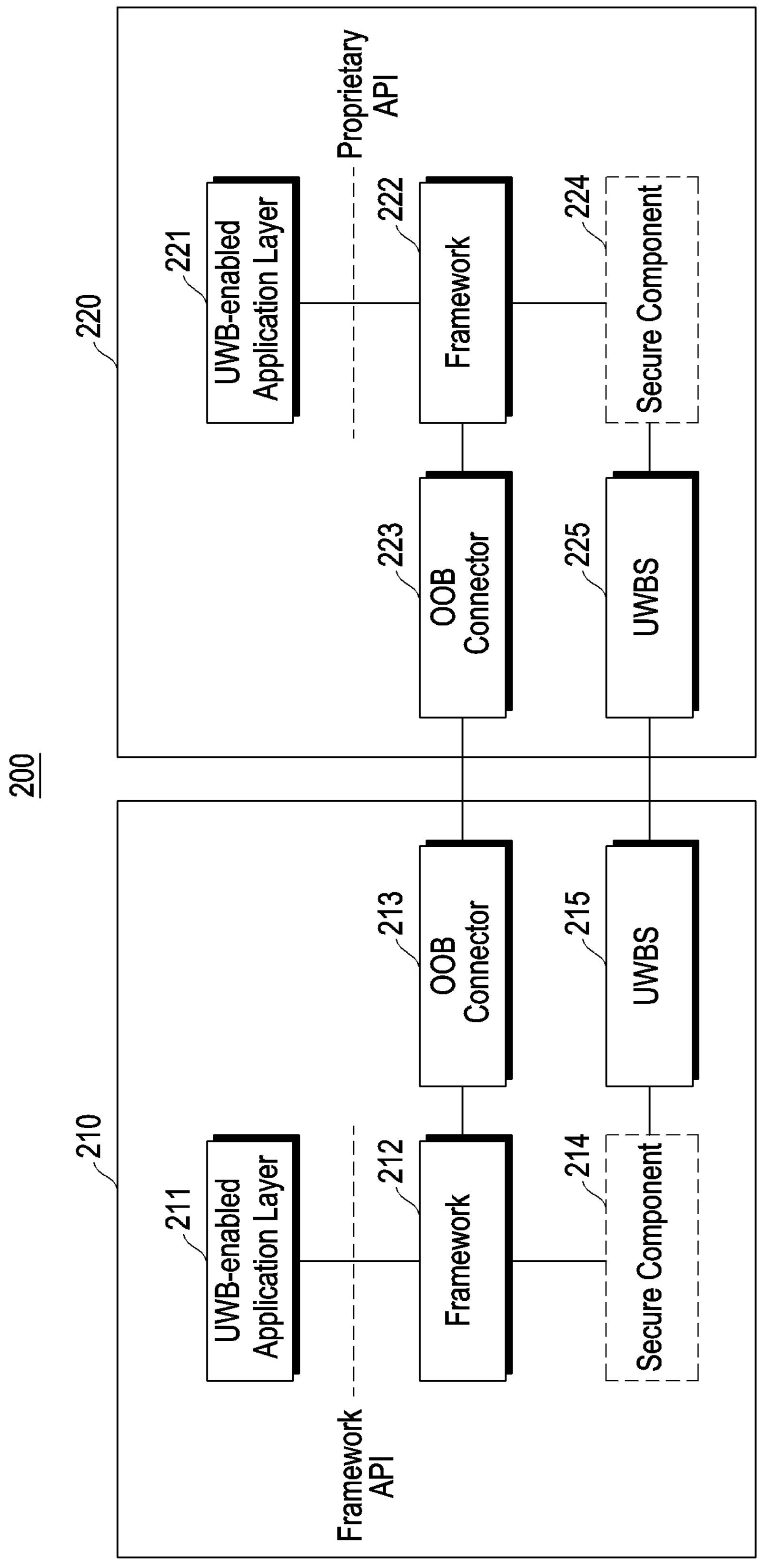
FIG. 2 is a view illustrating an example configuration of a communication system including an electronic device supporting a UWB-based service.

FIG. 2 is a view illustrating an example configuration of a communication system including an electronic device supporting a UWB-based service.

Referring to FIG. 2, a communication system 200 includes a first electronic device 210 and a second electronic device 220. In an embodiment, the first electronic device (first UWB device) 210 may be, e.g., a smart ranging device, and the second electronic device (second UWB device) 220 may be, e.g., a ranging device.

The first electronic device 210 may host, e.g., one or more UWB-enabled Applications 211, which may be installed by the user (e.g., a mobile phone). It may be based on the framework API. The second electronic device 220 does not provide a framework API, and for example, may use a proprietary interface to implement a specific UWB-enabled application 221 provided only by the manufacturer.

The first electronic device 210 and the second electronic device 220 may include UWB-enabled application layers 211 and 221, frameworks 212 and 222, OOB components/connectors 213 and 223, secure components 214 and 224, and/or UWBSs 215 and 225. According to an embodiment, some components may be omitted, and an additional component may further be included.

The first electronic device 210 and the second electronic device 220 may generate an OOB connection (channel) through the OOB connectors 213*a* and 223*a* and generate a UWB connection (channel) through the UWBSs 215 and 225 and communicate with each other.

Figure 3:
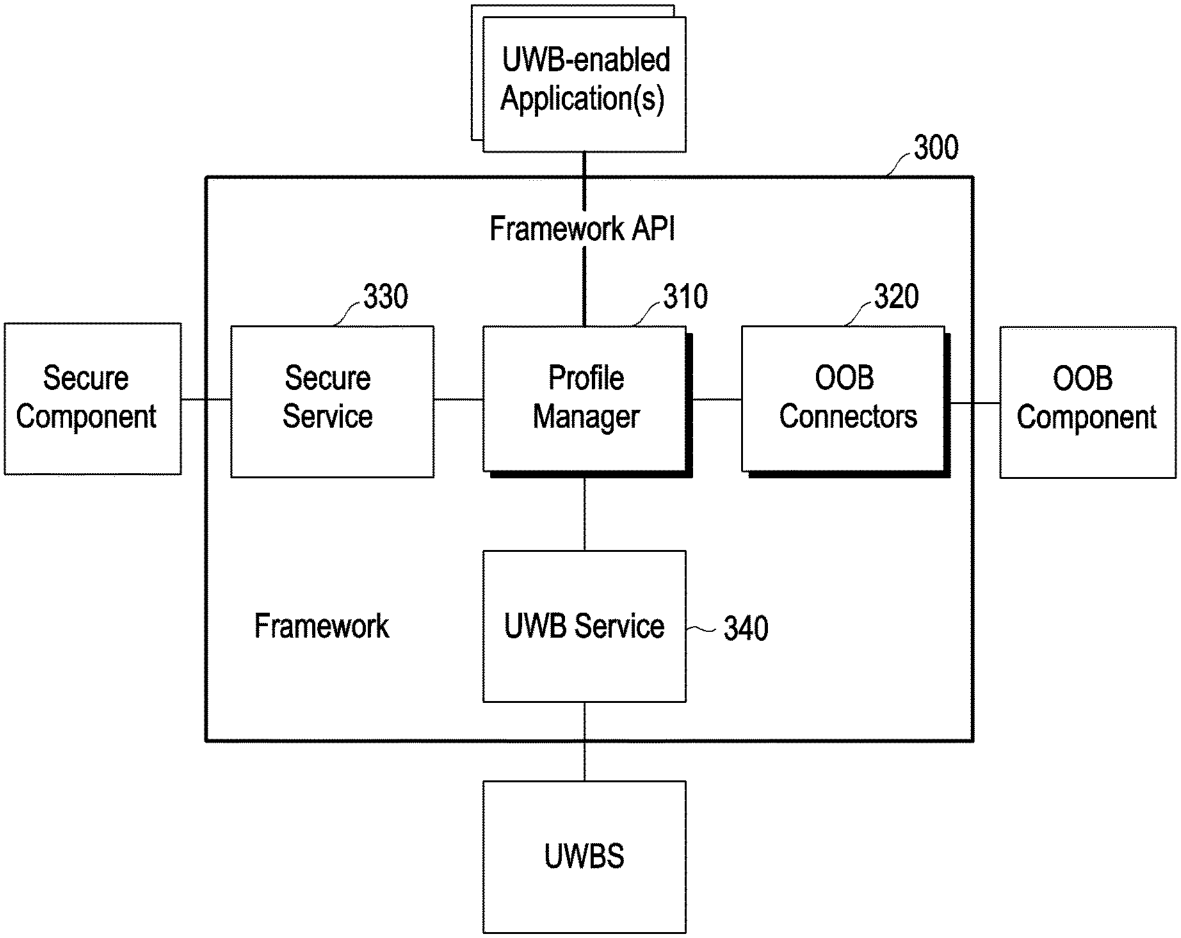
FIG. 3 is a view illustrating an example configuration of a framework included in an electronic device supporting a UWB-based service.

FIG. 3 is a view illustrating an example configuration of a framework included in an electronic device supporting a UWB-based service.

The framework of FIG. 3 may be a FiRa framework as defined in, e.g., the FIRA CONSORTIUM CSML specifications.

The framework 300 may be a set of logical software components. The UWB-enabled application may interface with the framework 300 through the framework API provided by the framework.

Referring to FIG. 3, the framework 300 may include a profile manager 310, an OOB connector 320, a secure service 330, and/or a UWB service 340. According to an embodiment, some components may be omitted, and an additional component may further be included.

The profile manager 310 may manage a profile(s) available on the ranging device. The profile may be a set of UWB and OOB configuration parameters required to establish a successful UWB session between ranging devices. The profile manager 310 may abstract the UWB and OOB configuration parameters from the UWB-enabled application.

The OOB connector 320 may be a component for establishing an OOB connection between ranging devices. The OOB connector 320 may handle the discovery phase and connection phase for providing a UWB-based service.

The secure service 330 may serve to interface with a secure component, such as a secure element (SE), eSE, or trusted execution environment (TEE). The secure component may be a component that interfaces with the UWBS to transfer UWB ranging data to the UWBS.

The SE is a safe secure module based on tamper-resistant characteristics and, if no contract relationship is established between various entities, installation and driving of an application are limited.

The eSE means a fixed SE fixed and used in the electronic device. The eSE is typically manufactured exclusively for the manufacturer at the request of the terminal manufacturer, and may be manufactured including the operating system and framework. For the eSE, a service control module in the form of an applet may be remotely downloaded and installed and be used for various secure services, such as e-wallet, ticketing, e-passport, or digital key.

The TEE may be an S/W-centered secure environment that creates a virtual separated environment based on, e.g., a code supported by a specific chipset (e.g., ARM-based). The TEE has tamper-resistant characteristics but has the advantages of large available memory, high speed, and low costs as compared with the SE. Further, since various service providers are immediately available within a range allowed by the mobile manufacturer, the TEE has the advantage of low complexity between entities as compared with the SE.

The UWB service 340 may be a component that provides access to the UWBS.

Hereinafter, embodiments of a UWB-based secure proximity payment method are described with reference to each figure.

Upon proximity payment based on the distance between the user's electronic device (UE) (e.g., the user's mobile device) and the payment device (payment terminal) (e.g., a point of sales (POS) terminal), if the distance is manipulated by the attacker, payment reliability may be problematic. For example, the attacker's distance manipulation may result in a compromised payment (e.g., a payment between the user (or UE) that is not actually in the pay zone and the payment terminal), rather than an intended payment (e.g., a payment between the user (or UE) where is actually in the pay zone and the payment UE). This may occur when the payment terminal recognizes that the user who is not indeed in the pay zone is located in the pay zone and performs a payment transaction with the user due to the attacker's distance enlargement attack.

Such a distance manipulation issue may be addressed through UWB secure ranging. However, conventional UWB secure ranging is performed using OOB communication, such as BLE, and a secure component, such as eSE or TEE, along with UWB communication, rather than being performed by UWB communication alone, due to power consumption and deterioration of ranging capability during data communication.

In this case, the capability of UWB secure ranging in an environment where there are a plurality of concurrent users, due to capability limitations (e.g., the number of BLE sessions that may be simultaneously supported) associated with OOB communication of the payment terminal.

Accordingly, a new procedure is required which may address the UWB secure ranging capability deterioration issue.

Figure 4:
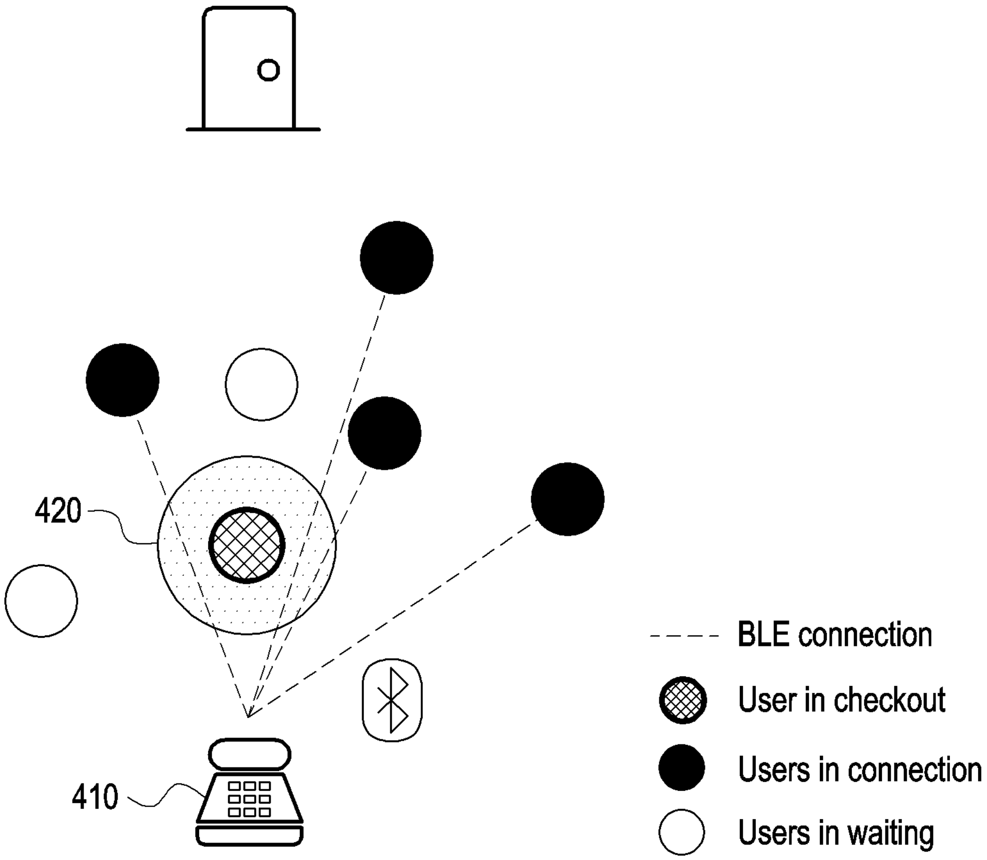
FIG. 4 illustrates a proximity payment method through secure ranging using OOB communication.

FIG. 4 illustrates a proximity payment method through secure ranging using OOB communication.

In the embodiment of FIG. 4, OOB communication is assumed to be BLE communication. However, without limitations thereto, as the OOB communication, other communication schemes (e.g., Zigbee or NFC) having the same or similar functions may apply.

Referring to FIG. 4, when secure ranging using BLE communication is performed, it is needed to establish a BLE connection (communication channel) between the payment terminal 410 and the user (payment target) that is the target for actual payment transaction among a plurality of users capable of communicating with the payment terminal/device 410. In the disclosure, 'user' may be used to denote the user's electronic device. In other words, in the disclosure, 'user' and 'UE' may be interchangeably used. In the disclosure, 'payment target' may be used to denote the electronic device of the user who is the target for actual payment transaction. In other words, in the disclosure, 'payment target' and 'electronic device of payment target' may be interchangeably used.

As shown in FIG. 4, the plurality of users may include, e.g., users in checkout through barcode scanning, users in BLE connection, and/or users waiting for connection (users in waiting). In this case, the user in checkout may be located in the pay zone 420.

In an embodiment, the payment user, as a user of intended payment, may be, e.g., a user located closest to the payment terminal or located foremost in a predetermined payment line, a user in checkout, a user located in a predetermined area (e.g., pay zone), or a user who meets two or more of corresponding conditions (e.g., a user who is located closest to the payment terminal or foremost in a predetermined payment line and has checked out, or a user located in the pay zone who has checked out).

In this case, various factors may cause delay of BLE connection for the payment target. For example, when the number of BLE sessions that the payment terminal 410 may simultaneously support is smaller than the number of users capable of BLE communication with the payment device 410, the BLE connection to the payment target may be delayed. Or, when the payment target last enters the connection mode due to the scan duty cycle or other factors, the BLE connection for the payment target may be delayed. The BLE connection delay causes an increase in the time required for payment.

To address the BLE connection delay issue, a method for providing priority for BLE connection to the payment target needs to be provided. For example, it is required to provide a method that identifies users matching the capability (e.g., users who correspond to the number of BLE sessions simultaneously supportable) according to the capability of the payment terminal 410 (e.g., the number of BLE sessions simultaneously supportable) and determines the priority of them. Thus, the payment device 410 may perform a secure ranging procedure through a quick BLE connection for the user with the highest priority, thereby identifying the payment target rapidly.

Figure 5:
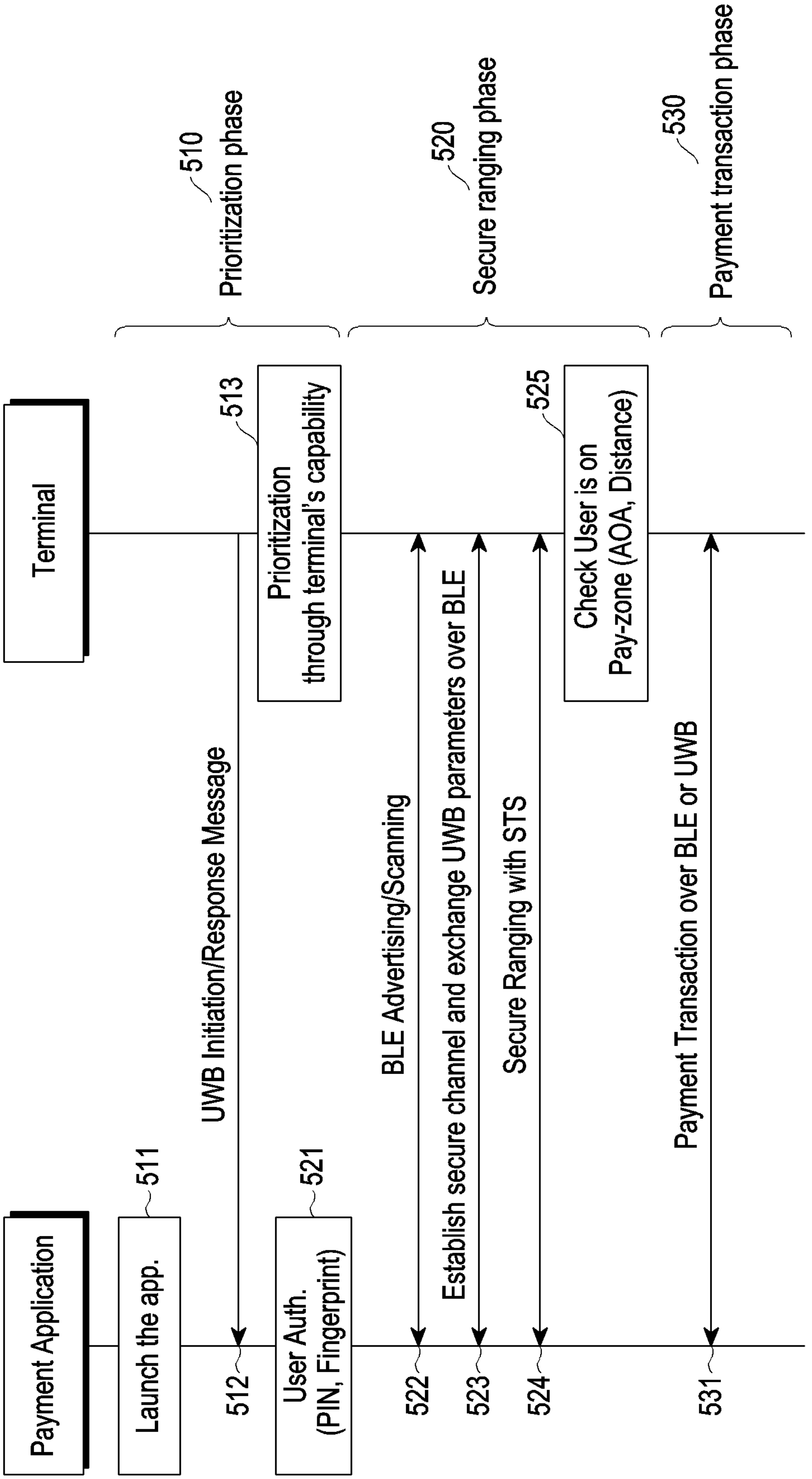
FIG. 5 illustrates a proximity payment method through secure ranging according to an embodiment of the disclosure.

FIG. 5 illustrates a proximity payment method through secure ranging according to an embodiment of the disclosure.

In the embodiment of FIG. 5, secure ranging may be secure ranging using OOB communication. In this case, OOB communication is assumed to be BLE communication. However, without limitations thereto, as the OOB communication, other communication schemes having the same or similar functions may apply.

Referring to FIG. 5, a proximity payment method may be performed between a payment application and a payment device (terminal). In an embodiment, the payment application may be an application included (or installed) in the user's electronic device (UE). Accordingly, the operation of the payment application in the disclosure may be understood as the operation of a UE including the payment application.

In an embodiment, the UE may correspond to the first UWB device (or the second UWB device) of FIG. 2 or may be a UWB device including the whole or part of the configuration of the first UWB device (or the second UWB device). In an embodiment, the payment terminal may correspond to the second UWB device (or the first UWB device) of FIG. 2 or may be a UWB device including the whole or part of the configuration of the second UWB device (or the first UWB device).

In an embodiment, the payment application and the payment terminal may be a UWB-enabled application and a UWB-enabled terminal, respectively, including a payment transaction function.

In the embodiment of FIG. 5, the proximity payment method may include a prioritization phase 510, a secure ranging phase 520 and/or a payment transaction phase 530. Each phase is described below.

Prioritization Phase

The prioritization phase 510 may be a phase for determining priorities for users (or UEs) for proximity payment. In an embodiment, the prioritization phase 510 may include an operation 511 of launching a payment application of a UE, an operation 512 of transmitting/receiving a UWB initiation/response message between the payment application and a payment terminal (ranging operation), and/or a prioritization operation 513 according to the capability of the payment terminal. An example of the prioritization phase 510 is described below with reference to FIG. 7.

In an embodiment, the ranging operation 512 may be an operation for measuring a distance/direction (angle) between electronic devices using a UWB communication scheme. For example, the ranging operation 512 may include an operation of transmitting and receiving a ranging initiation message and a response message, respectively, through a ranging frame RFRAME and an operation of obtaining distance information according to a preset ranging method or mode based on information (e.g., timestamp information) included in the ranging frame. For a detailed description of the above-described ranging operation 512, reference the descriptions of IEEE Std 802.15.4z-2020 and FIRA CONSORTIUM UWB MAC TECHNICAL REQUIREMENTS.

In an embodiment, the initiation message (UWB initiation message) may be a ranging initiation message specified in the "IEEE 802.15.4z standard" and the "UWB MAC standard of the FiRa consortium".

In an embodiment, the response message (UWB response message) may be a ranging response message specified in the "IEEE 802.15.4z standard" and the "UWB MAC standard of the FiRa consortium".

Secure Ranging Phase

The secure ranging phase 520 may be a phase of performing secure ranging for proximity payment.

In an embodiment, the secure ranging phase 520 may include a user authentication operation 521, a BLE advertising/scanning operation (discovery operation) 522, an operation (connection operation) 523 of configuring a secure channel through BLE and exchanging (or negotiating) UWB parameters, a UWB secure ranging operation 524 using a scrambled timestamp sequence (STS), and/or an operation 525 of checking whether the user is in the pay zone.

In an embodiment, the user authentication operation 521 may be performed using, e.g., a personal identification number (PIN) and/or a fingerprint.

In an embodiment, the discovery operation 522 is a procedure for discovering a UWB device (service), and may be performed through OOB communication (e.g., BLE communication) or in-band communication (e.g., UWB communication).

In an embodiment, the connection operation 523 may be a procedure for establishing a UWB channel or session by exchanging parameters for establishing a channel or session for UWB communication. In an embodiment, the exchanged UWB parameters may include a ranging session key (UWB ranging session key (URSK)).

In an embodiment, the UWB secure ranging operation 524 may perform a secured ranging operation based on the STS generated from the session key (URSK) exchanged through the UWB parameter exchange operation 523. In this case, the session key is a key for protecting the UWB session (e.g., ranging session) and may be used to derive the STS. For a detailed description of the above-described secure ranging operation 524, reference may be made to the descriptions of IEEE Std 802.15.4z-2020, FIRA CONSORTIUM UWB MAC TECHNICAL REQUIREMENTS, and FIRA CONSORTIUM COMMON SERVICE & MANAGEMENT LAYER TECHNICAL SPECIFICATION.

In an embodiment, the operation 525 of checking whether the user is in the pay zone may be performed based on the angle of arrival (AOA) and/or distance information. In an embodiment, the AOA and/or distance information may be obtained through the UWB secure ranging operation 524.

The issues, such as distance manipulation, may be addressed through the above-described secure ranging phase 520, so that the reliability of payment may be guaranteed.

An example of the secure ranging phase 520 is described below with reference to FIG. 8.

Payment Transaction Phase

The payment transaction phase 530 may be a phase of processing proximity payment. In an embodiment, the payment transaction phase 530 may include a payment transaction operation 531 using OOB (e.g., BLE) communication or UWB communication.

When BLE communication is used, the payment transaction phase 530 may include an operation of transmitting/receiving a message (payment message) for payment transaction through an already generated BLE secure channel. In an embodiment, communication of the payment message may follow, e.g., ISO/IEC 7816-4 application protocol data unit (APDU)-based electromagnetic wave (EMW) protocol.

When UWB communication is used, the payment transaction phase 530 may include an operation of transmitting/receiving a payment message including data encrypted using a data encryption key (data payload encryption key) derived from the UWB session key. In an embodiment, communication of the payment message may follow the ISO/IEC 7816-4 APDU-based EMW protocol.

Figure 6:
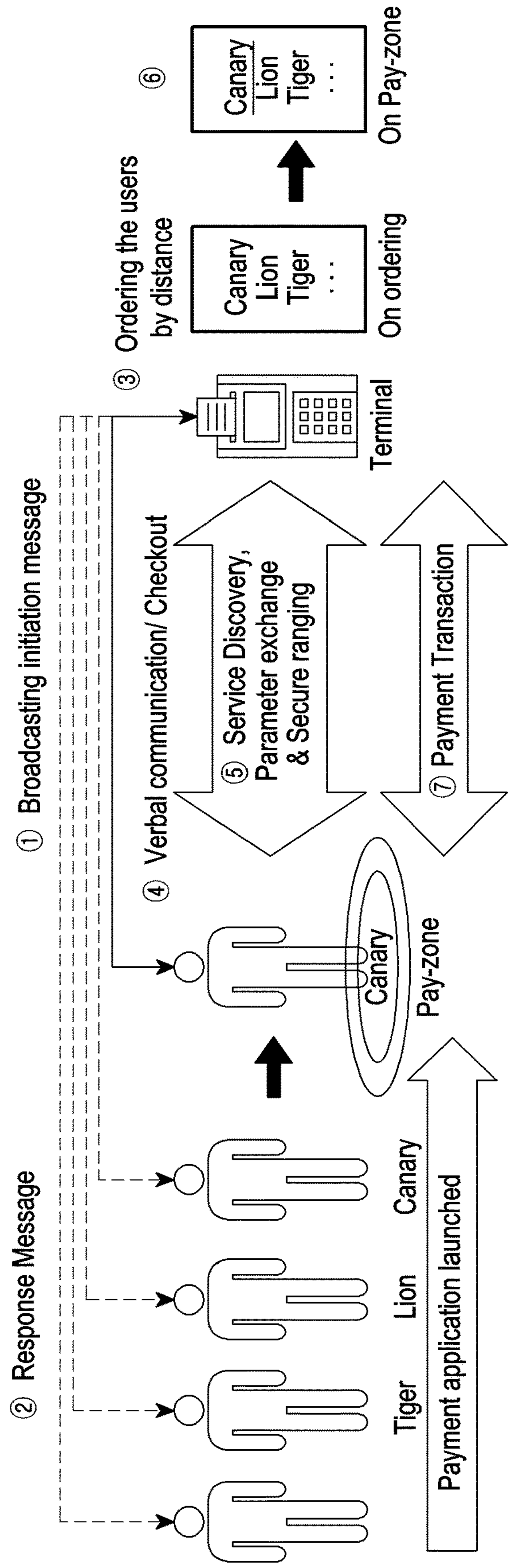
FIG. 6 illustrates a payment scenario using a proximity payment method through secure ranging according to an embodiment of the disclosure.

FIG. 6 illustrates a payment scenario using a proximity payment method through secure ranging according to an embodiment of the disclosure.

The proximity payment method according to the embodiment of FIG. 6 may be an example of the proximity payment method of FIG. 5.

In the embodiment of FIG. 6, it is assumed that there are a plurality of users (e.g., Tiger, Lion, and Canary) capable of UWB communication, and one user (payment target) (e.g., Canary) among the plurality of users executes the payment application and is located in the pay zone.

Referring to FIG. 6, in operation 1, the payment terminal may transmit an initiation message (UWB initiation message). For example, the payment terminal may broadcast UWB initiation messages.

In operation 2, at least one user among the plurality of users may transmit a response message (UWB response message) to the payment terminal in response to the initiation message. For example, the payment target in the pay zone and at least one user out of the pay zone may transmit a UWB response message to the payment terminal. In this case, the payment terminal may obtain location information (distance and/or angle information) about each user who has transmitted the response message, based on a preset ranging method.

In operation 3, the payment terminal may determine the order of at least one user based on a preset criterion (ordering). In an embodiment, the payment terminal may determine the order of the at least one user who has transmitted the response message, based on distance information. For example, the payment terminal may determine the order of the users in order of distance (e.g., from the user who is closest to the payment terminal to the user who is farthest from the payment terminal).

In operation 4, an operation for verbal communication/checkout may be performed. The verbal communication/checkout may be performed to directly identify whether the corresponding user is the payment target.

In operation 5, a secure ranging procedure (phase) may be performed between the user (or payment application) located in the pay zone and the payment terminal. In an embodiment, the secure ranging procedure may include a service discovery operation, a BLE connection and UWB parameter exchange operation and/or a secure ranging operation.

In operation 6, the payment terminal may identify whether a specific user (e.g., the payment target) is in a specific area (e.g., the pay zone) based on the result of the secure ranging procedure of operation 5. For example, the payment terminal may identify whether the payment target (e.g., Canary) is in the actual pay zone based on the result of the secure ranging procedure. In an embodiment, the payment terminal may determine whether the payment target is in the actual pay zone using distance information and/or direction information (AoA). The distance manipulation issue may be addressed through the identification procedure using secure ranging, so that the intended payment between the payment terminal and the user who is supposed to actually make payment may be precisely performed.

In operation 7, a payment transaction procedure (phase) may be performed between the payment terminal and the user (or payment application) located in the pay zone.

Figure 7:
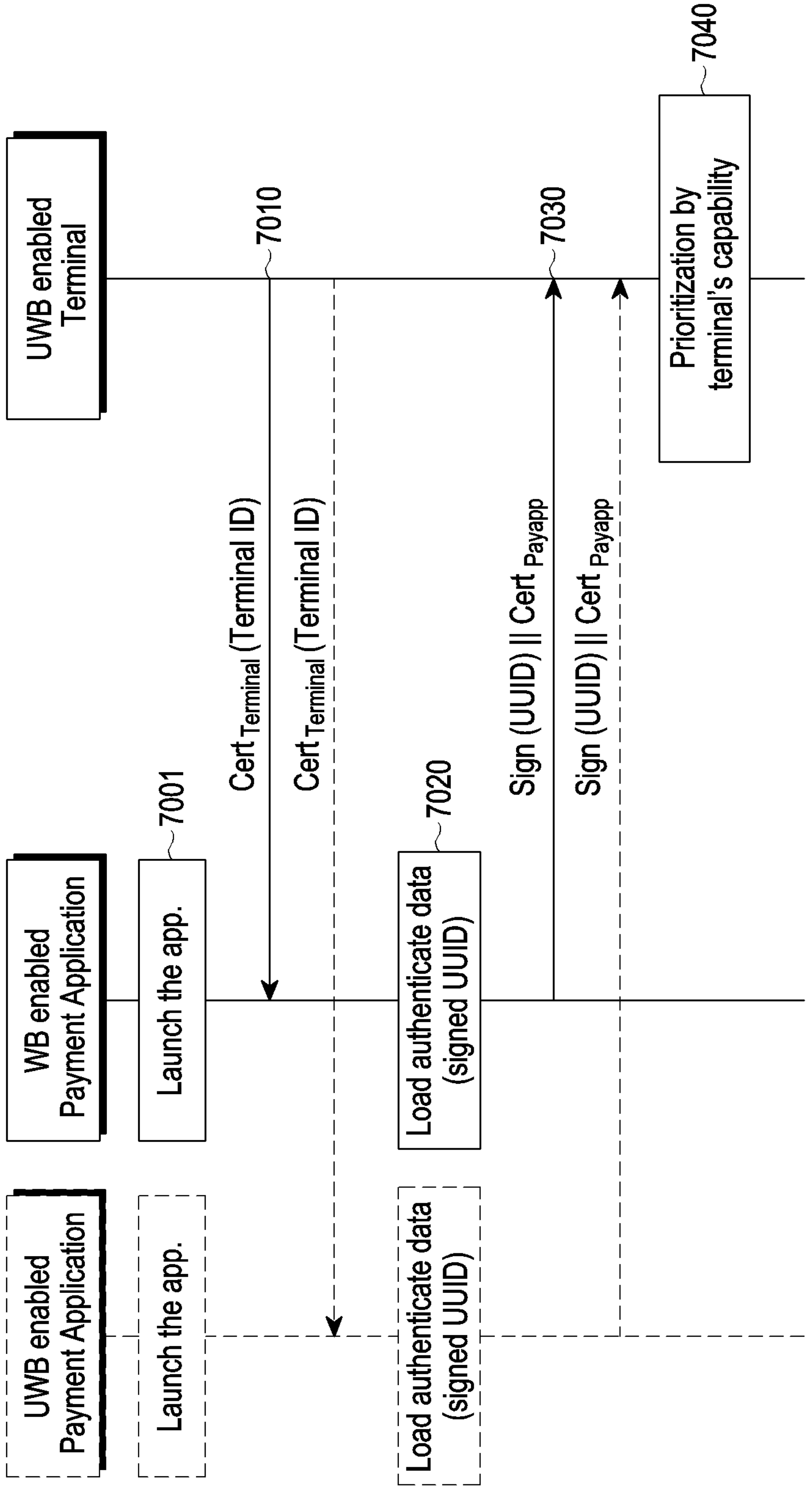
FIG. 7 illustrates a prioritization phase of a proximity payment method according to an embodiment of the disclosure.

FIG. 7 illustrates a prioritization phase of a proximity payment method according to an embodiment of the disclosure.

The prioritization phase of the embodiment of FIG. 7 may be an example of the prioritization phase of the embodiment of FIG. 5. The prioritization phase may be performed between the payment terminal and at least one payment application. In the embodiment of FIG. 7, the payment terminal may be a UWB-enabled terminal (device), and the payment application may be a UWB-enabled application (payment application).

In an embodiment, the payment application may be included in the UE. Accordingly, the operation of the payment application in the disclosure may be understood as the operation of a UE including the payment application.

In an embodiment, the UE including the payment application may execute (operation 7001) the payment application before the prioritization phase or within the prioritization phase.

In the embodiment of FIG. 7, through the exchange of the terminal certificate and the payment application certificate (or authentication data/information), the payment application and the payment terminal may recognize each other as an authenticated (or verified) target (reliable target) and may start communication with each other.

Referring to FIG. 7, in operation 7010, the payment terminal may transmit a terminal certificate associated with a terminal ID for identifying the payment terminal. In an embodiment, the payment terminal may include a terminal certificate (CertTerminal (Terminal ID)) (or data (authentication data (information)) of the terminal certificate) including the terminal ID (e.g., object ID) in the UWB initiation message and may transmit the UWB initiation message. In an embodiment, the payment terminal may broadcast the UWB initiation message. In an embodiment, the UWB initiation message may be included and transmitted in the RFRAME.

In an embodiment, the terminal certificate may be issued and/or signed by a higher entity (e.g., issuer or payment authority). In an embodiment, the certificate of the issuer may be pre-stored (or installed) in the payment application.

In operation 7020, the payment application may obtain (or load) authentication data. In an embodiment, when receiving a UWB initiation message including a terminal certificate or a terminal certificate, the payment application may obtain authentication data.

In an embodiment, the authentication data may include identification information for identifying the payment application. In an embodiment, the identification information may be a universal unique identifier (UUID) or a signed UUID. In an embodiment, the UUID may be allocated to the payment application by a higher entity (e.g., an issuer or authority) and may be stored (or installed) in the payment application. In an embodiment, the signed UUID may be signed by a higher entity (e.g., issuer or payment authority) or the user (or payment application).

In operation 7030, the payment application may transmit the signed UUID and/or the certificate of the payment application to the UWB-enabled terminal. In an embodiment, the payment application may include a UUID (Sign (UUID)) signed by the user and a payment application certificate (CertPayapp) (or data processed based on the signed UUID and the payment application certificate) capable of verifying the corresponding signature in the UWB response message, and may transmit the UWB response message. In another embodiment, the payment application may include the UUID (Sign(UUID)) signed by the higher entity in the UWB response message, and may transmit the UWB response message. As such, when the UUID is signed by the higher subject, the certificate for verifying the signature may not be transmitted together.

In an embodiment, the UWB response message may be a message corresponding to the received UWB initiation message. In an embodiment, the payment terminal may establish a BLE connection based on the received UUID. In this way, the prioritization phase and the secure ranging phase may be associated to each other through the UUID.

Meanwhile, operation 7030 may be performed by all or some of the payment applications that have received the terminal certificate or the UWB initiation message including the terminal certificate. In this case, each UWB-enabled payment application may perform the corresponding operation based on its own UUID associated with the corresponding payment application.

In operation 7040, the payment terminal may determine the priority of the user (UE). In an embodiment, the payment terminal may determine the priority according to a predetermined criterion (e.g., a distance criterion) based on the received UWB response message. In an embodiment, the payment terminal may determine the priority according to the capability of the corresponding terminal. For example, the payment terminal may identify users (e.g., as many users as corresponding to the number of BLE sessions simultaneously supportable) corresponding to BLE capability (e.g., the number of BLE sessions simultaneously supportable) of the corresponding terminal, and may determine priorities for the identified number of users. For example, when the number of supportable BLE sessions of the corresponding payment terminal is three, the payment terminal may identify only three UEs among the UEs that have transmitted the UWB response message, and may determine priorities of the three identified UEs.

In an embodiment, the identification and/or prioritization by the UE may be based on distance information between the payment terminal and the UE. For example, the payment terminal may identify only three UEs closest to the payment terminal as targets for prioritization, and may determine priorities of the corresponding UEs in order of distance (e.g., from the closest distance to the farthest distance). In an embodiment, the distance information may be obtained through a UWB ranging method based on the timestamp information included in the UWB initiation/response message.

The prioritization method based on the capability and/or distance information about the terminal described above in operation 7040 is merely an example of the prioritization method of the proximity payment method, but is not limited thereto, and the priority may be determined according to various methods.

Figure 8:
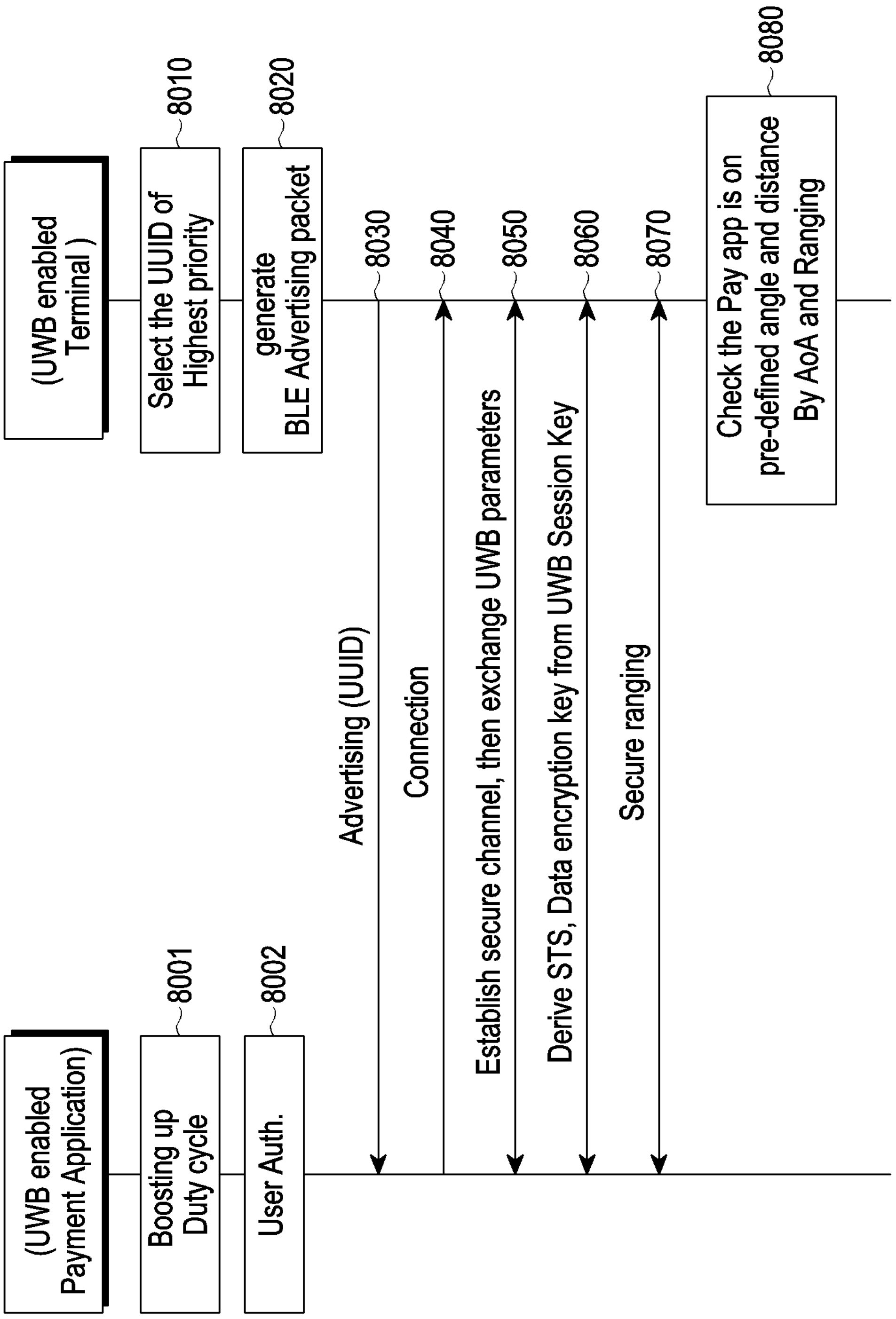
FIG. 8 illustrates a secure ranging phase of a proximity payment method according to an embodiment of the disclosure.

FIG. 8 illustrates a secure ranging phase of a proximity payment method according to an embodiment of the disclosure.

The secure ranging phase of the embodiment of FIG. 8 may be an example of the secure ranging phase of the embodiment of FIG. 5. Also, the secure ranging phase of FIG. 8 may be a phase performed after the prioritization phase of FIG. 7. For example, the secure ranging phase of FIG. 8 may be a phase performed between the payment terminal and the payment application sharing the UUID through the prioritization phase of FIG. 7. In the embodiment of FIG. 8, the payment terminal may be a UWB-enabled terminal (device), and the payment application may be a UWB-enabled application (payment application).

In an embodiment, the payment application may be included in the UE. Accordingly, the operation of the payment application in the disclosure may be understood as the operation of a UE including the payment application.

In an embodiment, the secure ranging phase may be a secure ranging phase using an OOB such as BLE. The payment application may set a duty cycle to a high value (boosting up) (operation 8001) and may perform user authentication (operation 8002) in order to quickly establish a BLE connection within or before the secure ranging phase.

Referring to FIG. 8, in operation 8010, the payment terminal may select a UUID having the highest priority. For example, the payment terminal may select a UUID for a UE (or a payment application) having the highest priority. In an embodiment, the priority may be determined through the prioritization phase of FIG. 7.

In operation 8020, the payment terminal may generate a BLE advertising packet including the selected UUID.

In operation 8030, the payment terminal may transmit (or broadcast) the generated BLE advertising packet.

In operation 8040, the payment application may request BLE connection from the payment terminal. In an embodiment, when receiving the BLE advertising packet, the payment application may identify the UUID included in the BLE advertising packet and identify whether the UUID is its own UUID. When the UUID is its own UUID, the payment application may request the UWB-enabled terminal to make a BLE connection. Or, when the UUID is not its own UUID, the payment application may not request BLE connection from the payment terminal. Accordingly, a BLE connection may be established only between the UE having the highest priority and the UWB-enabled terminal. This fast BLE connection to the payment target makes it possible to address the payment time delay.

In operation 8050, the BLE secure channel establishment procedure and the UWB parameter exchange procedure may be performed between the payment application and the payment terminal. Through the parameter exchange procedure, the session key URSK for protecting the UWB session may be shared.

In operation 8060, a procedure for obtaining the STS and/or data encryption key may be performed between the payment application and the payment terminal. In an embodiment, the STS and/or data encryption key may be derived using the UWB session key obtained through the UWB parameter exchange procedure of operation 8050.

In operation 8070, UWB secure ranging may be performed between the payment application and the payment terminal. In an embodiment, the secure ranging may be performed based on the STS generated from the session key.

In operation 8080, the payment terminal may identify whether the user (UE) is in the pay zone based on the information obtained through the secure ranging of operation 8070. In an embodiment, the payment terminal may identify whether the UE including the UWB-enabled payment application is located at a predefined distance and/or angle, based on the distance information and/or the AoA information obtained through the secure ranging, thereby identifying whether the UE is in the pay zone. Accordingly, the payment terminal may identify that the user having the highest priority corresponds to the user in the actual pay zone, and may perform a payment transaction procedure with the corresponding user. As described above, by accurately identifying the actual payment target through the secure ranging, it is possible to defend against the distance enlarging attack from the distance attacker, thereby addressing deterioration of the payment reliability due to the distance manipulation.

Figure 9:
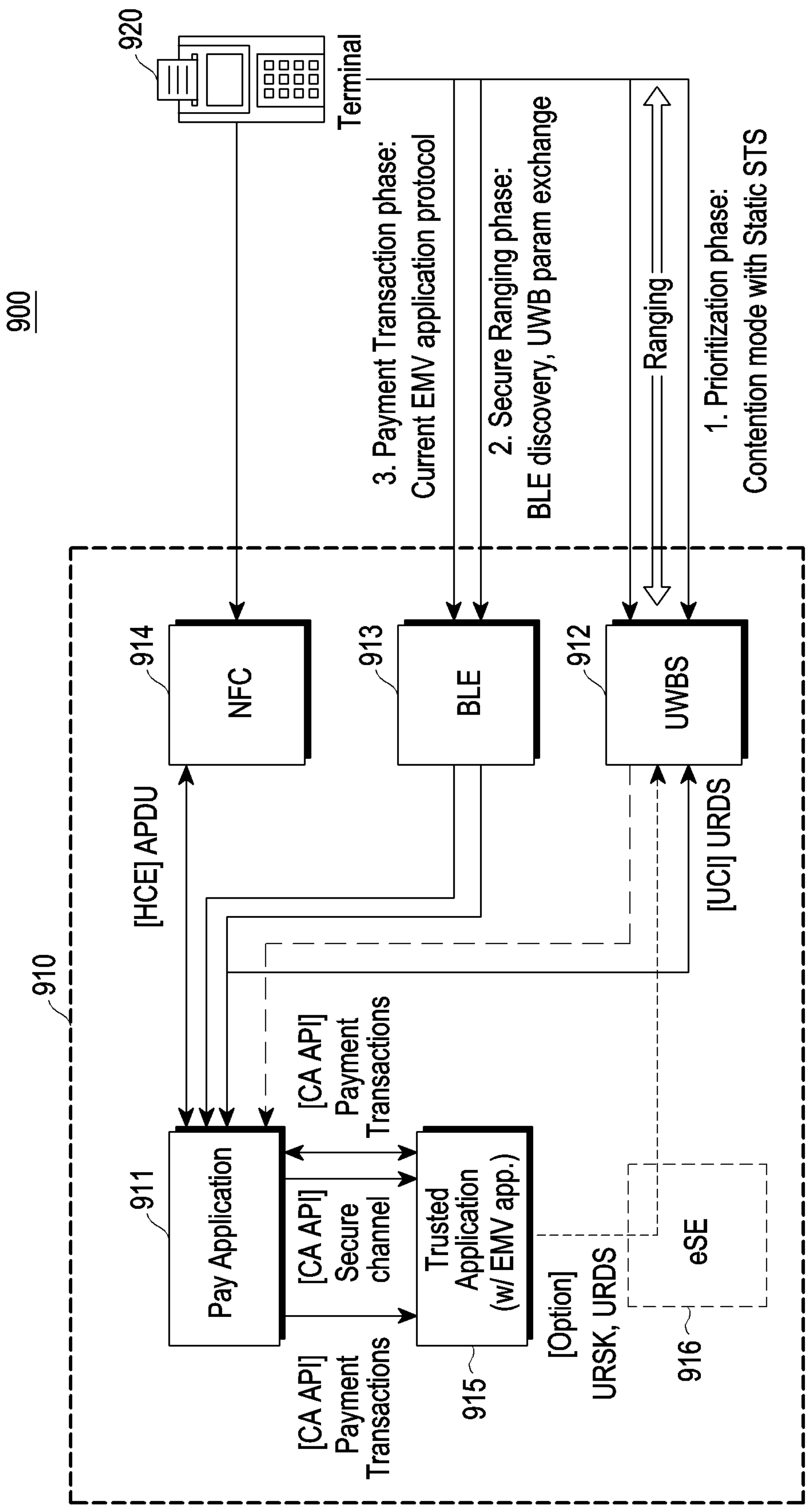
FIG. 9 illustrates a proximity payment system according to an embodiment of the disclosure.

FIG. 9 illustrates a proximity payment system according to an embodiment of the disclosure.

Referring to FIG. 9, a payment transaction system 900 may include a UE 910 and a payment terminal (device) 920.

In an embodiment, the UE 910 may correspond to the first UWB device (or the second UWB device) of FIG. 2 or may be a UWB device including the whole or part of the configuration of the first UWB device (or the second UWB device). In an embodiment, the payment terminal 920 may correspond to the second UWB device (or the first UWB device) of FIG. 2 or may be a UWB device including the whole or part of the configuration of the second UWB device (or the first UWB device).

In an embodiment, the payment application 911 and the payment terminal 920 may be a UWB-enabled application and a UWB-enabled terminal, respectively, including a payment transaction function.

In the embodiment of FIG. 9, the UE 910 may include a UWB communication module 912 for UWB communication and/or at least one OOB communication module 913 and 914 for OOB communication. In an embodiment, the OOB communication module may include a BLE communication module 913 for BLE communication and/or an NFC communication module 914 for NFC communication. In the disclosure, the UWB communication module 912 may be a module that corresponds to the above-described UWB subsystem (UWBS) or includes the whole or part of the UWB subsystem (UWBS). In the disclosure, the OOB communication module may be a module that corresponds to the above-described OOB component or includes the whole or part of the OOB component.

In an embodiment, the UE 910 may perform a prioritization phase (phase 1) with the payment terminal 920 through the UWB communication module 912. For example, the UE 910 may perform a prioritization phase through a contention mode (a contention-based ranging mode/method) using a static STS. The prioritization phase may follow the procedure described above with reference to FIGS. 5 and 7.

In an embodiment, the UE 910 may perform a secure ranging phase (phase 2) with the payment terminal 920 through the UWB communication module 912 and the BLE communication module 913. In this case, a BLE discovery (service discovery) operation and a UWB parameter exchange operation may be performed through the BLE communication module 913, and a ranging operation may be performed through the UWB communication module 912. The secure ranging phase may follow the procedure described above with reference to FIGS. 5 and 8.

In an embodiment, the UE 910 may perform a payment transaction phase (phase 3) with the payment terminal 920 through the BLE communication module 913 and/or the UWB communication module 912. In an embodiment, the UE 910 may perform payment transaction based on the EMV application protocol.

In the embodiment of FIG. 9, the UE 910 may include a payment application 911 connected to the communication module. For example, the payment application 911 may be a UWB-enabled application.

In an embodiment, the payment application 911 and the communication module may communicate through a predefined interface (e.g., a UWB command interface (UCI)).

In the embodiment of FIG. 9, the UE 910 may include at least one secure component 915 and 916 connected to the payment application 911. For example, the UE 910 may include at least one of a trusted application (TA) 915 or an embedded secure element (eSE) 916 as a secure component. In an embodiment, the TA 915 may be included together with an application that follows the EMV protocol (EMV application protocol).

In an embodiment, the secure components 915 and 916 may be used for secure payment transaction and/or secure channel establishment through the payment application 911.

In an embodiment, the payment application 911 and the secure components 915 and 916 may communicate through a predefined interface (e.g., a TEE client application API (CA API)).

Figure 10:
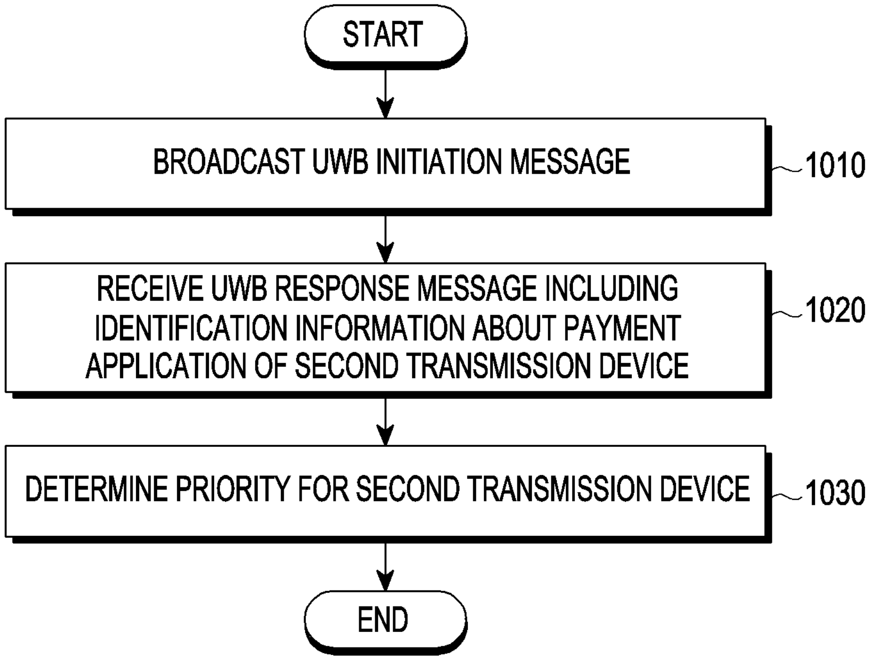
FIG. 10 is a flowchart illustrating a method by a first electronic device according to an embodiment of the disclosure.

FIG. 10 is a flowchart illustrating a method by a first electronic device according to an embodiment of the disclosure.

In the embodiment of FIG. 10, the first electronic device may be a payment terminal, and the second electronic device may be a UE including a payment application. In an embodiment, the payment application may be a UWB-enabled application, and the payment terminal may be a UWB-enabled terminal. In the embodiment of FIG. 10, the operation of the second electronic device may be understood as the operation of the payment application of the second electronic device. The operations of FIG. 10 may follow the corresponding operations of FIGS. 1 to 9.

Referring to FIG. 10, the first electronic device may broadcast a UWB initiation message including certificate information about the first electronic device (1010). In an embodiment, the UWB initiation message may be transmitted through the ranging frame RFRAME. This may be performed, e.g., according to operation 7010 of FIG. 7.

The first electronic device may receive, from at least one second electronic device, a UWB response message including identification information about the payment application included in the second electronic device and/or certificate information about the payment application for verifying the identification information (1020). In an embodiment, the UWB response message may be transmitted through the ranging frame RFRAME. This may be performed, e.g., according to operation 7030 of FIG. 7.

The first electronic device may determine a priority for at least one second electronic device based on the UWB response message (1030). This may be performed, e.g., according to operation 7040 of FIG. 7.

In an embodiment, the first electronic device may perform secure ranging with the second electronic device using the first identification information about the payment application of the second electronic device having the highest priority.

In an embodiment, performing the secure ranging may include broadcasting a BLE advertising packet including the first identification information and/or receiving a request for BLE connection from the second electronic device having the first identification information.

In an embodiment, performing the secure ranging may further include establishing a secure channel with the second electronic device based on the request for the BLE connection, exchanging a UWB parameter including a UWB ranging session key with the second electronic device through the secure channel, obtaining an STS from the UWB ranging session key, performing the secure ranging with the second electronic device using the STS, and identifying whether a user of the second electronic device having the first identification information is located in a pay zone based on a result of the secure ranging.

In an embodiment, when it is identified that the user of the second electronic device having the first identification information is located in the pay zone, the first electronic device may perform payment transaction with the second electronic device.

In an embodiment, the identification information may be a UUID allocated to the payment application or a signed UUID. In an embodiment, the signed UUID may be signed by the payment application or a higher entity.

Figure 11:
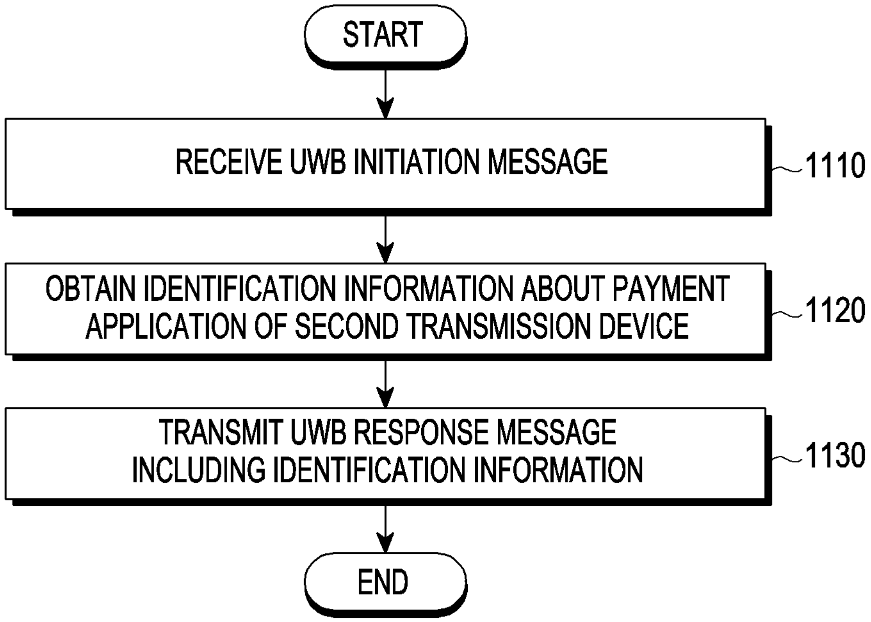
FIG. 11 is a flowchart illustrating a method by a first electronic device according to an embodiment of the disclosure.

FIG. 11 is a flowchart illustrating a method by a first electronic device according to an embodiment of the disclosure.

In the embodiment of FIG. 11, the first electronic device may be a payment terminal, and the second electronic device may be a UE including a payment application. In an embodiment, the payment application may be a UWB-enabled application, and the payment terminal may be a UWB-enabled terminal. In the embodiment of FIG. 11, the operation of the second electronic device may be understood as the operation of the payment application of the second electronic device. The operations of FIG. 11 may follow the corresponding operations of FIGS. 1 to 9.

Referring to FIG. 11, the second electronic device may receive a UWB initiation message including certificate information about the first electronic device from the first electronic device (1110). In an embodiment, the UWB initiation message may be transmitted through the ranging frame RFRAME. This may be performed, e.g., according to operation 7010 of FIG. 7.

The second electronic device may obtain identification information about the payment application included in the second electronic device (1120). This may be performed, e.g., according to operation 7020 of FIG. 7.

The second electronic device may transmit, to the first electronic device, a UWB response message including identification information about the payment application and/or certificate information about the payment application for verifying the identification information (1130). In an embodiment, the UWB response message may be transmitted through the ranging frame RFRAME. This may be performed, e.g., according to operation 7030 of FIG. 7.

In an embodiment, the second electronic device may receive a BLE advertising packet including the first identification information from the first electronic device and transmit a request for BLE connection to the first electronic device.

In an embodiment, the identification information may be a UUID allocated to the payment application or a signed UUID. In an embodiment, the signed UUID may be signed by the payment application or a higher entity.

Figure 12:
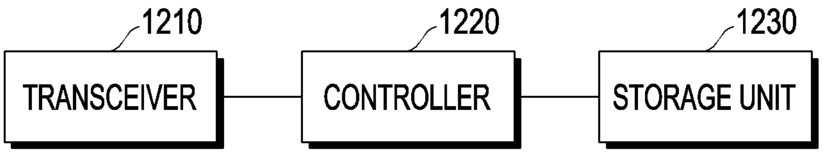
FIG. 12 is a view illustrating a structure of a first electronic device according to an embodiment of the disclosure.

FIG. 12 is a view illustrating a structure of a first electronic device according to an embodiment of the disclosure.

In the embodiment of FIG. 12, the first electronic device may be a payment terminal. In an embodiment, the payment terminal may be a UWB-enabled terminal.

Referring to FIG. 12, the first electronic device may include a transceiver 1210, a controller 1220, and a storage 1230. In the disclosure, the controller may be defined as a circuit or application-specific integrated circuit or at least one processor.

The transceiver 1210 may transmit and receive signals to/from other network entities. The transceiver 1210 may transmit and receive data for payment to/from the second electronic device through, e.g., UWB communication.

The controller 1220 may control the overall operation of the first electronic device according to an embodiment. For example, the controller 1220 may control inter-block signal flow to perform the operations according to the above-described flowchart. Specifically, the controller 1220 may control the operations of the first electronic device described above with reference to FIGS. 1 to 11.

The storage unit 1230 may store at least one of information transmitted/received via the transceiver 1210 and information generated via the controller 1220. For example, the storage unit 1230 may store information and data for payment transaction using UWB described above with reference to FIGS. 1 to 11.

Figure 13:
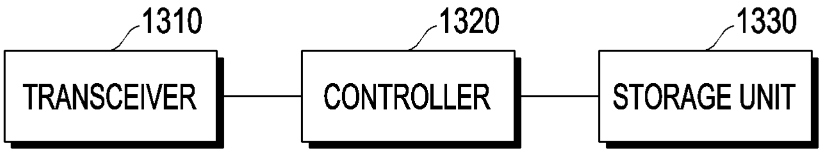
FIG. 13 is a view illustrating a structure of a second electronic device according to an embodiment of the disclosure.

FIG. 13 is a view illustrating a structure of a second electronic device according to an embodiment of the disclosure.

In the embodiment of FIG. 13, the second electronic device may be a UE including a payment application. In an embodiment, the payment application may be a UWB-enabled application. In the embodiment of FIG. 13, the operation of the second electronic device may be understood as the operation of the payment application of the second electronic device.

Referring to FIG. 13, the second electronic device may include a transceiver 1310, a controller 1320, and a storage 1330. In the disclosure, the controller may be defined as a circuit or application-specific integrated circuit or at least one processor.

The transceiver 1310 may transmit and receive signals to/from other network entities. The transceiver 1310 may transmit and receive data for payment to/from the first electronic device through, e.g., UWB communication.

The controller 1320 may control the overall operation of the second electronic device according to an embodiment. For example, the controller 1320 may control inter-block signal flow to perform the operations according to the above-described flowchart. Specifically, the controller 1320 may control the operations of the second electronic device described above with reference to FIGS. 1 to 11.

The storage unit 1330 may store at least one of information transmitted/received via the transceiver 1310 and information generated via the controller 1320. For example, the storage unit 1330 may store information and data for payment transaction using UWB described above with reference to FIGS. 1 to 11.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present invention have been described above, various changes may be made thereto without departing from the scope of the present invention. Thus, the scope of the disclosure should not be limited to the above-described embodiments, and should rather be defined by the following claims and equivalents thereof.

The invention claimed is:

1. A method by a first electronic device using ultra-wide band (UWB) communication, the method comprising:

broadcasting a UWB ranging initiation message including certificate information of the first electronic device;

receiving, from a second electronic device, a first UWB ranging response message including at least one of identification information related to the second electronic device and certificate information related to the second electronic device;

receiving, from a third electronic device, a second UWB ranging response message including at least one of identification information related to the third electronic device and certificate information related to the third electronic device;

determining orders of the second electronic device and the third electronic device based on distances, wherein the distances are obtained from UWB ranging related to the UWB ranging initiation message, the first UWB ranging response message, and the second UWB ranging response message;

selecting the second electronic device with the highest order among the second electronic device and the third electronic device, based on the determined orders; and establishing a UWB session with the second electronic device by exchanging at least one UWB parameter including a ranging session key;

performing, with the second electronic device, UWB secure ranging using a scrambled timestamp sequence (STS) generated from the ranging session key;

determining that the second electronic device is in a predetermined zone, based on an angle of arrival (AoA) and a distance which are obtained from the UWB secure ranging; and transmitting and receiving, with the second electronic device, a payment message including data encrypted using a data encryption key derived from the ranging session key, based on the determination.

2. The method of claim 1, wherein performing the UWB secure ranging comprises:

broadcasting a Bluetooth low energy (BLE) advertising packet including the identification information related to the second electronic device; and receiving, from the second electronic device, a request for a BLE connection based on the identification information related to the second electronic device.

3. The method of claim 1, wherein the identification information related to the second electronic device includes a universally unique identifier (UUID) allocated to a payment application or a UUID allocated to the payment application and signed.

4. A method by a second electronic device using ultra-wide band (UWB) communication, the method comprising:

receiving, from a first electronic device, a UWB ranging initiation message including certificate information of the first electronic device;

transmitting, to the first electronic device, a UWB ranging response message including at least one of identification information related to the second electronic device and certificate information related to the second electronic device;

in case that the second electronic device is selected among the second electronic device and a third electronic device based on a distance obtained from UWB ranging related to the UWB ranging initiation message and the UWB ranging response message, establishing a UWB session with the first electronic device by exchanging at least one UWB parameter including a ranging session key and performing, with the first electronic device, UWB secure ranging using a scrambled timestamp sequence (STS) generated from the ranging session key, wherein the second electronic device has the highest order among the second electronic device and the third electronic device that has transmitted a UWB ranging response message; and in case that the second electronic device is determined to be located in a predetermined zone based on an angle of arrival (AoA) and a distance which are obtained from the UWB secure ranging, transmitting and receiving, with the first electronic device, a payment message including data encrypted using a data encryption key derived from the ranging session key.

5. The method of claim 4, further comprising:

receiving, from the first electronic device, a Bluetooth low energy (BLE) advertising packet including the identification information; and transmitting, to the first electronic device, a request for a BLE connection.

6. The method of claim 4, wherein the identification information includes a universally unique identifier (UUID) allocated to a payment application or a UUID allocated to the payment application and signed.

7. The method of claim 6, wherein the signed UUID is signed by the payment application or a higher entity of the payment application.

8. A first electronic device using ultra-wide band (UWB) communication, the first electronic device comprising:

a transceiver; and at least one processor connected to the transceiver, wherein the at least one processor is configured to:

broadcast a UWB ranging initiation message including certificate information of the first electronic device;

receive, from a second electronic device, a first UWB ranging response message including at least one of identification information related to the second electronic device and certificate information related to the second electronic device;

receive, from a third electronic device, a second UWB ranging response message including at least one of identification information related to the third electronic device and certificate information related to the third electronic device;

determine orders of the second electronic device and the third electronic device based on distances, wherein the distances are obtained from UWB ranging related to the UWB ranging initiation message, the first UWB ranging response message, and the second UWB ranging response message;

select the second electronic device with the highest order among the second electronic device and the third electronic device, based on the determined orders;

establish a UWB session with the second electronic device by exchanging at least one UWB parameter including a ranging session key;

perform, with the second electronic device, UWB secure ranging using a scrambled timestamp sequence (STS) generated from the ranging session key;

determine that the second electronic device is in a predetermined zone, based on an angle of arrival (AoA) and a distance which are obtained from the UWB secure ranging; and transmit and receive, with the second electronic device, a payment message including data encrypted using a data encryption key derived from the ranging session key, based on the determination.

9. The first electronic device of claim 8, wherein the at least one processor is further configured to:

broadcast a Bluetooth low energy (BLE) advertising packet including the identification information related to the second electronic device; and receive, from the second electronic device, a request for a BLE connection based on the identification information related to the second electronic device.

10. The first electronic device of claim 8, wherein the identification information is a universally unique identifier (UUID) allocated to a payment application or a UUID allocated to the payment application and signed.

11. A second electronic device using ultra-wide band (UWB) communication, the second electronic device comprising:

a transceiver; and at least one processor connected to the transceiver, wherein the at least one processor is configured to:

receive, from a first electronic device, a UWB ranging initiation message including certificate information of the first electronic device;

transmit, to the first electronic device, a UWB ranging response message including at least one of identification information related to the second electronic device and certificate information related to the second electronic device;

in case that the second electronic device is selected among the second electronic device and a third electronic device based on a distance obtained from UWB ranging related to the UWB ranging initiation message and the UWB ranging response message, establish a UWB session with the first electronic device by exchanging at least one UWB parameter including a ranging session key and perform, with the first electronic device, UWB secure ranging using a scrambled timestamp sequence (STS) generated from the ranging session key, wherein the second electronic device has the highest order among the second electronic device and the third electronic device that has transmitted a UWB ranging response message; and in case that the second electronic device is determined to be located in a predetermined zone based on an angle of arrival (AoA) and a distance which are obtained from the UWB secure ranging, transmit and receive, with the first electronic device, a payment message including data encrypted using a data encryption key derived from the ranging session key.

12. The second electronic device of claim 11, wherein the at least one processor is further configured to:

receive, from the first electronic device, a Bluetooth low energy (BLE) advertising packet including the identification information, and transmit, to the first electronic device, a request for a BLE connection.

13. The second electronic device of claim 12, wherein the identification information includes a universally unique identifier (UUID) allocated to a payment application or a UUID allocated to the payment application and signed, and wherein the signed UUID is signed by the payment application or a higher entity of the payment application.

* * * * *